US 9,009,750 B2

(12) United States Patent
Folgner et al.

(10) Patent No.: US 9,009,750 B2
(45) Date of Patent: *Apr. 14, 2015

(54) POST PROCESSING VIDEO TO IDENTIFY INTERESTS BASED ON CLUSTERED USER INTERACTIONS

(75) Inventors: Mike Folgner, Burlingame, CA (US); Ryan Cunningham, San Francisco, CA (US)

(73) Assignee: Google Inc., Mountain View, CA (US)

( * ) Notice: Subject to any disclaimer, the term of this patent is extended or adjusted under 35 U.S.C. 154(b) by 283 days.

This patent is subject to a terminal disclaimer.

(21) Appl. No.: 13/433,108

(22) Filed: Mar. 28, 2012

(65) Prior Publication Data

US 2012/0185889 A1   Jul. 19, 2012

Related U.S. Application Data

(63) Continuation of application No. 12/495,703, filed on Jun. 30, 2009, now Pat. No. 8,176,509.

(51) Int. Cl.
| | |
|---|---|
| *H04N 7/16* | (2011.01) |
| *H04H 60/46* | (2008.01) |
| *H04H 60/33* | (2008.01) |
| *H04H 60/65* | (2008.01) |
| *H04N 5/775* | (2006.01) |
| *H04N 9/82* | (2006.01) |
| *H04N 21/4728* | (2011.01) |

(52) U.S. Cl.
CPC ............... *H04H 60/46* (2013.01); *H04H 60/33* (2013.01); *H04H 60/65* (2013.01); *H04N 5/775* (2013.01); *H04N 9/8205* (2013.01); *H04N 21/4728* (2013.01)

(58) Field of Classification Search
None
See application file for complete search history.

(56) References Cited

U.S. PATENT DOCUMENTS

| | | | |
|---|---|---|---|
| 2003/0028873 A1* | 2/2003 | Lemmons | 725/36 |
| 2006/0015925 A1* | 1/2006 | Logan | 725/135 |
| 2008/0276272 A1* | 11/2008 | Rajaraman et al. | 725/37 |

* cited by examiner

*Primary Examiner* — Cai Chen
(74) *Attorney, Agent, or Firm* — Lowenstein Sandler LLP

(57) ABSTRACT

Methods and systems for post-processing video to identify interests based on clustered user interactions are provided. A client application program running on a set-top box is provided to enable a user to interactively select a point of interest within video content being played via the set-top box. The selected points of interest of multiple users is aggregated, and clusters of the points of interest are determined. Objects associated with the clusters are determined by analyzing video segments containing the clustered points of interest. Messages related to the objects are created and sent to the relevant users that indicated selection of points of interest which correlate to the objects.

20 Claims, 10 Drawing Sheets

POST PROCESSING VIDEO TO IDENTIFY INTERESTS BASED ON CLUSTERED USER INTERACTIONS

CLAIM OF PRIORITY

This application is a continuation of U.S. patent application Ser. No. 12/495,703, filed on Jun. 30, 2009 now U.S. Pat. No. 8,176,509, the disclosure of which is hereby incorporated by reference in its entirety for all purposes.

BACKGROUND

1. Field of the Invention

The present invention relates to methods and systems for post-processing video to identify user interests based on clustered interactions.

2. Description of the Related Art

Advances related to broadcast television programming have provided a richer experience for television users. For example, with the aid of specialized equipment such as a set-top box, users may access program schedules, descriptions of particular programs, channels organized by topic, and other information and features. The advent of digital video recorder (DVR) technology has also enabled users to digitally record and playback video content. Oftentimes, a DVR is constantly in operation recording the program that is being watched by the user, and preserving the most recently recorded material as a buffer of a given length. This affords the user the ability to "pause" live television and rewind to a previous time point in the program.

However, despite these advances, the broadcast television viewing experience remains generally non-interactive in nature, and decoupled from the vast sum of information available over the internet. Users are unable to indicate with a high degree of specificity their interests when viewing television content. Therefore, there is a need in the art for systems and methods to allow users to interactively specify interests when watching television, and to receive a relevant message in response to their specified interests.

SUMMARY

Embodiments of the present invention provide methods and systems for post-processing video to identify interests based on clustered user interactions. It should be appreciated that the present invention can be implemented in numerous ways, such as a process, an apparatus, a system, a device or a computer program product embodied on a computer readable medium. Several inventive embodiments of the present invention are described below.

In one embodiment, a method for sending messages to users related to video content is provided. According to the method, interactive data indicating points of interest within the video content is received from the users, the points of interest being selected by users during viewing of the video content. Then, spatiotemporal clusters of the points of interest are determined An object of the video content indicated by each of the spatiotemporal clusters is then determined. A message associated with each of the determined objects is created, each message containing information relating to its corresponding object. Each of the messages is sent to the users whose selected points of interest correlate with the objects associated with the messages.

In one embodiment, the points of interest are selected by users during viewing of the video content.

In one embodiment, the interactive data indicating points of interest includes an image frame of the video content and coordinates of a location within the image frame.

In one embodiment, the determination of spatiotemporal clusters of the points of interest includes determining spatiotemporal density of the points of interest based upon geometric distances between points of interest within frames of the video content and temporal distances between points of interest in different frames of the video content. The spatiotemporal clusters are determined to be those regions of the video content having the highest spatiotemporal density.

In one embodiment, the selected points of interest are determined by enabling users to pause playback of the video content, maneuver a reticle to a point of interest, and indicate selection of the point of interest.

In one embodiment, the video content comprises television programming.

In one embodiment, the sending of the messages comprises sending e-mail messages.

In one embodiment, a computer program product for sending messages to users related to video content is provided. The computer program product comprises program instructions embodied on a computer-readable medium. The computer program product includes program instructions for receiving interactive data indicating points of interest within the video content from the users. Program instructions for determining spatiotemporal clusters of the points of interest are provided. Additionally, program instructions for determining an object of the video content indicated by each of the spatiotemporal clusters. Program instructions for creating a message associated with each of the determined objects are provided, each message containing information related to its corresponding object. And the computer program product also includes program instructions for sending each of the messages to the users whose selected points of interest correlate with the objects associated with the messages.

In one embodiment, the computer program product includes program instructions for determining spatiotemporal clusters of the points of interest comprises. These include program instructions for determining spatiotemporal density of the points of interest based upon geometric distances between points of interest within frames of the video content and temporal distances between points of interest in different frames of the video content. Moreover, program instructions are provided for determining the spatiotemporal clusters to be those regions of the video content having the highest spatiotemporal density.

In one embodiment, the computer program product, further comprises program instructions for determining the selected points of interest. These include program instructions for pausing playback of the video content. Program instructions for maneuvering a reticle to a point of interest are also provided. And program instructions for indicating selection of the point of interest are provided, as well.

In one embodiment, a system for sending messages to users related to video content is provided. The system comprises one or more server computers, the one or more server computers including various functional units. A receiving unit is provided for receiving interactive data indicating points of interest within the video content from the users. A clustering unit determines spatiotemporal clusters of the points of interest. An analysis unit is provided for determining an object of the video content indicated by each of the spatiotemporal clusters. A message creation unit is provided for creating a message associated with each of the determined objects, each message containing information related to its corresponding object. And the system includes a message sending unit for sending each of the messages to the users whose selected points of interest correlate with the objects associated with the messages.

In one embodiment, the clustering unit of the system further comprises a density determination unit for determining spatiotemporal density of the points of interest based upon geometric distances between points of interest within frames of the video content and temporal distances between points of interest in different frames of the video content. Additionally, the clustering unit determines the spatiotemporal clusters to be those regions of the video content having the highest spatiotemporal density.

In one embodiment, the system further comprises a selection unit configured to enable a user to pause playback of the video content, maneuver a reticle to a point of interest, and indicate selection of a point of interest.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe systems and methods for enabling users to specify points of interest within video content, and generating messaging responses which relate to the specified points of interest. A client application is provided on a set-top box, which enables a user watching video content via the set-top box to select points of interest within the video content, thereby generating interactive data. The interactive data is frame-matched against a media database to ascertain the precise context of the interactive data, such as the specific video program and exact frame from which the interactive data were taken. Interactive data from multiple users is aggregated, and cluster analysis is performed to determine clusters of points of interest. The clusters are analyzed to determine their significance, which may relate to objects of the video content. For each identified object, a message is created which contains information related to the object. The message is sent to those users that selected points of interest which correlate with the object.

It will be obvious, however, to one skilled in the art, that the present invention may be practiced without some or all of these specific details. In other instances, well known process operations have not been described in detail in order not to unnecessarily obscure the present invention.

A related application entitled "IDENTIFICATION AND TRANSFER OF A MEDIA OBJECT SEGMENT FROM ONE COMMUNICATIONS NETWORK TO ANOTHER", U.S. patent application Ser. No. 12/344,148, filed Dec. 24, 2008, now abandoned, is directed to sharing television broadcast video over the internet. The disclosure of this application is incorporated herein by reference in its entirety.

Figure 1:
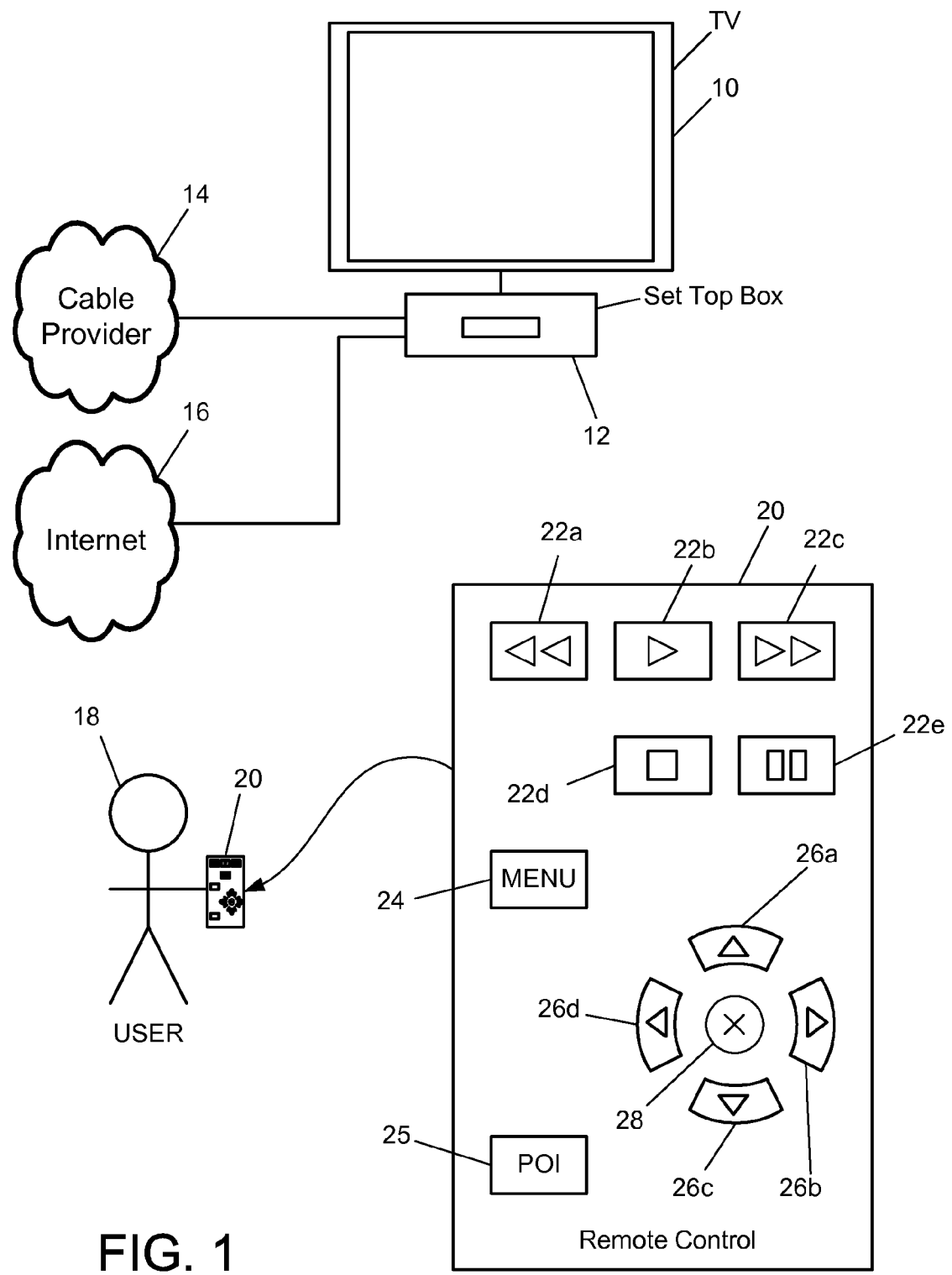
FIG. 1 illustrates a system for viewing television programming, in accordance with an embodiment of the invention.

With reference to FIG. 1, a system for viewing television programming is illustrated, in accordance with an embodiment of the invention. A television 10 is shown connected to a set-top box 12, which is in turn connected to a video signal source 14. A set-top box will be generally understood by those skilled in the art as a device which interfaces between a television and an external signal source, processing the signal to provide content for display on the television screen. The set-top box 12 may include any of various analog tuners (e.g. NTSC, PAL), digital tuners (e.g. QAM, ATSC) or other analog and digital decoders for receiving and processing the signal from the video signal source 14. The video signal source 14 may consist of any of various media signal providers as are known in the art, such as cable, satellite, DSL, IPTV, VHF/UHF antenna, etc. Additionally, the set-top box 12 is connected to the Internet 16. The connection to the video signal source 14 and the Internet 16 may take place over the same physical connection, or they may require two different physical connections.

The set-top box 12 may function as a digital video recorder (DVR) which is capable of digitally recording and playing back video content. As is known in the art, a DVR may be programmable to automatically record video content. Metadata associated with the particular content being recorded may be associated with the recording. Furthermore, even when no program is selected for recording, the DVR may still function in a continuous manner, wherein television programming which is being watched is continuously recorded. This continuously recorded video may be stored in a buffer of limited length, so that, for example, the DVR only stores the most recent five minutes of video being watched. In this manner, a user is thus enabled to "pause" live television and review up to the previous five minutes of the program being watched. When the video is paused, then the DVR begins storing all of the video which is being recorded, so that the user can watch the remainder of the program at a later time.

A user 18 may control the content which is displayed on the television 10 by controlling the set-top box 12 via remote control 20. As shown in an expanded view, the remote control 20 includes several buttons which are operative to control various features of the set-top box 12. By way of example, buttons 22a, 22b, 22c, 22d, and 22e provide rewind, playback, fast-forward, stop and pause functions, respectively. A menu button 24 provides access to menu systems of the set-top box 12, by which the user 18 may access various features of the set-top box 12. These may include programming schedules and information, display options, recording setup options, and other settings related to functionality and operation of the set-top box 12. Navigational buttons 26a, 26b, 26c, and 26d are provided as part of the remote control 20. An input button 28 may be used to indicate selection of a particular option or function of the set-top box. A point-of-interest button 25 is provided, the functionality of which is explained in further detail below.

Figures 2A, 2B:
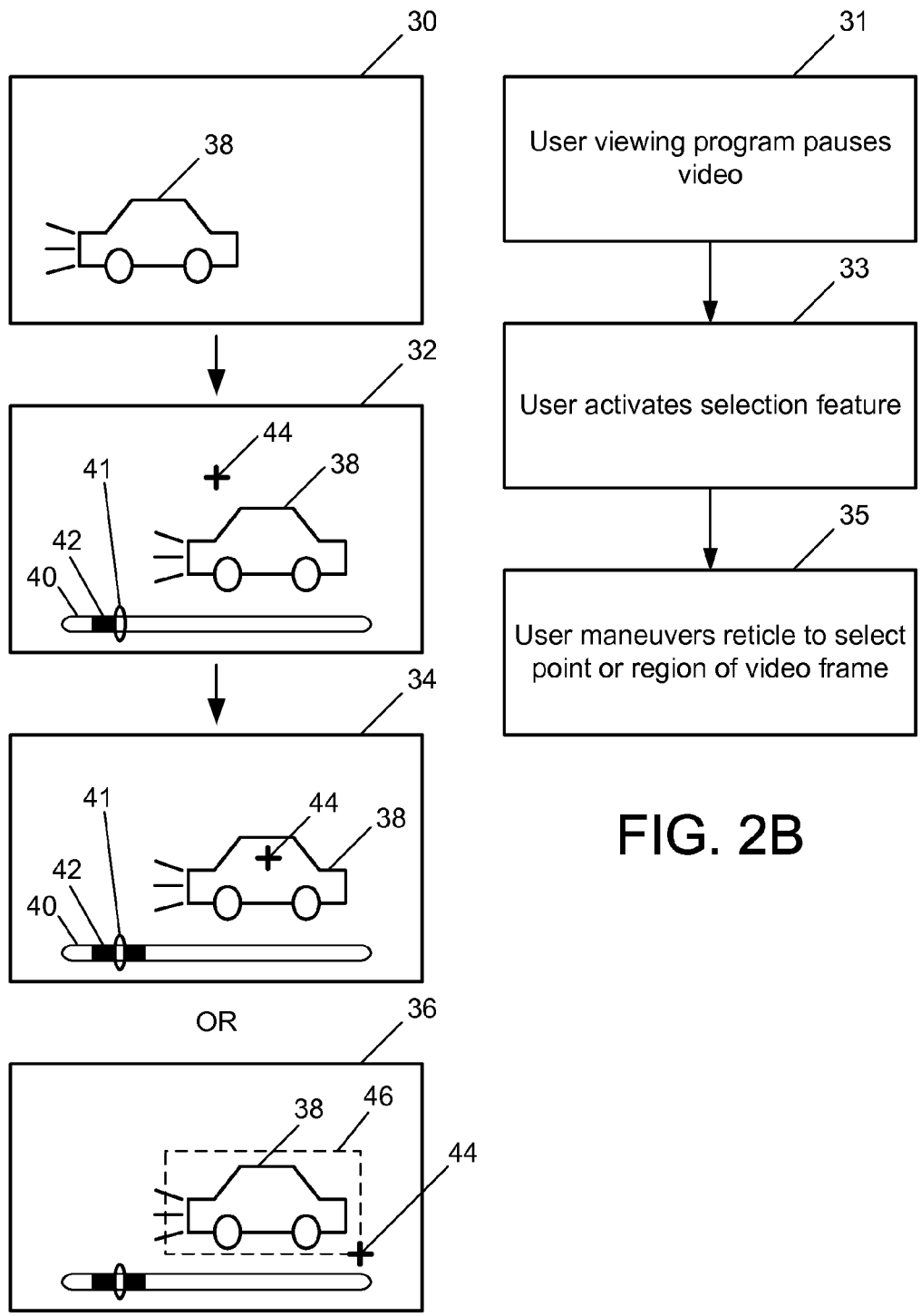
FIG. 2A illustrates a series of display frames which demonstrate a method of selecting a point of interest within video content, in accordance with an embodiment of the invention.
FIG. 2B illustrates a method for indicating an area of interest in a television program, in accordance with an embodiment of the invention.

FIG. 2A illustrates a series of display frames as would be displayed on the television 10, which demonstrate a method of selecting a point of interest within video content, in accordance with an embodiment of the invention. At display frame 30 a broadcast program is shown in progress. The program may be viewed "live" as it is being broadcast by the signal provider 14, or it have been recorded from an earlier broadcast, and played back from storage on the set-top-box 12. Provided by way of example only, a vehicle 38 is shown in the display frame 30.

A user 18 viewing the program may see the vehicle 38 on-screen and find herself interested in the vehicle 38. The user 18 can then pause the program by, for example, pressing the pause button 22e on the remote control 20. As shown by display frame 32, the program is then paused, which causes a program duration meter 40 to be displayed. The program duration meter 40 is representative of the entire length of the program. A present location indicator 41 is situated along the program duration meter 40 and provides a visual indication of the time point within the program at which the current display frame is located. Additionally, in the case wherein the user 18 is watching a live broadcast of the program, a recorded portion of the program is indicated by a shaded region 42 of the program duration meter 40. As shown at display frame 32, upon being paused, the shaded region 42 indicates that a certain portion of the program has already been recorded. As described above, this may be facilitated by the set-top box continuously maintaining a buffer of any program that is being watched. By doing so, the set-top box 12 enables the user 18 to rewind to an earlier time point while watching a live broadcast, if so desired.

The user 18 can also activate a point-of-interest (POI) selection mode by, for example, pressing the POI button 25 on the remote control 20. In the POI selection mode, a user is able to specify a point or region of interest within an image frame of a program. The POI selection mode facilitates selection of the point of interest in an intuitive manner by providing a graphical interface for directly indicating what a user is interested in within an image frame of the program. In one embodiment, the activation of the POI selection mode causes a reticle 44 to be displayed in the display frame 32. The reticle 44 may be maneuvered on-screen by, for example, utilizing navigation buttons 26a, 26b, 26c, and 26d of remote control 20. In other embodiments, the reticle may be maneuvered by utilizing various interfaces as are known in the art, such as a mouse, touchpad, joystick, motion detection sensor, etc. As shown at display frame 34, the reticle 44 has been maneuvered to the vehicle 38. A user 18 may indicate selection of the particular point at which the reticle 44 is located by, for example, pressing the input button 28 of remote control 20. In this manner, the user 18 indicates her interest in the vehicle 38 as shown in the program. It is also noted that as the set-top box 12 continues to record the program while the user 18 is maneuvering the reticle and selecting a point of interest in the paused mode, so the shaded region 42 of the program duration meter 40 is extended to indicate the additional portion of the program which has been recorded.

Alternatively, a user 18 may wish to specify a region of an image frame in which the user 18 is interested. Therefore, as shown at display frame 36, a user may indicate selection of a region of interest by maneuvering reticle 44 and creating a box 46 which defines the region of interest. In the present illustration the box 46 encompasses the vehicle 38, thereby indicating the user's 18 interest in the vehicle 38. The rectangular shape of box 46 is provided by way of example only. In other embodiments, various other shapes such as square, circular, ellipsoid, etc, or free-form shapes may be "drawn" by the user 18 on-screen so as to indicate a region of interest within the program being watched.

With reference to FIG. 2B, a method for indicating an area of interest in a television program is illustrated, in accordance with an embodiment of the invention. The method is applied to a user watching a television program by using a set-top box. At step 31, a user viewing the program pauses the video playback of the program so as to display an image frame of the program. This may be accomplished by use of DVR technology of the set-top box as has been described. Thus, the presently described method may be applied to both the situation in which the user is watching a live television broadcast, or the situation in which the user is watching a previously recorded television broadcast.

At step 33, the user activates a selection feature of the set-top box which enables specification of an area of interest in the television program. The activation of the selection feature may be indicated to the user by display of a reticle or pointer or other icon on-screen. At step 35, the user maneuvers the reticle so as to select a point of interest or a region of interest within the image frame being displayed.

Figure 3:
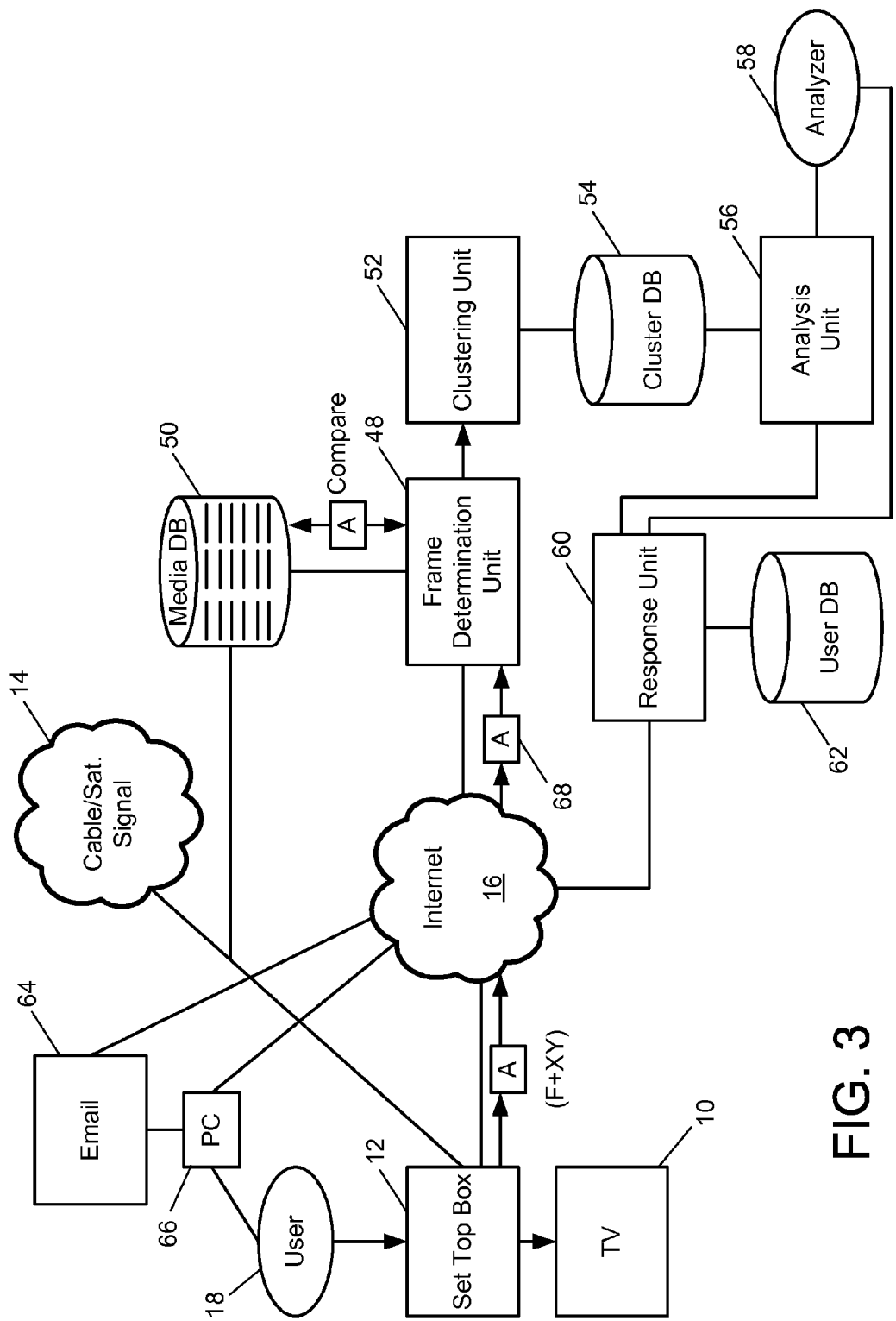
FIG. 3 illustrates a system for generating a response to indicated user interests in video content, in accordance with an embodiment of the invention.

With reference to FIG. 3, a system for generating a response to indicated user interests in video content is provided, in accordance with an embodiment of the invention. A user 18 views video content, such as a television program, on a television 10, which is connected to a set-top box 12. The set-top box 12 receives the video content from a media signal provider 14, such as a cable, satellite, DSL, antenna or other provider or data carrier as is known in the art. The set-top box 12, which is described in further detail below, includes features for enabling the user 18 to provide interactive data 68 which indicates an area of interest within the video content. The set-top box is connected to a network 16, which may be a network such as a LAN, WAN, or the Internet.

Via the network 16, the set-top box communicates the interactive data 68 to a frame determination unit 48. The frame determination unit 48 references the interactive data 68 against a media database 50 in order to determine the precise nature of the interactive data 68, such as the specific program and particular image frame within that program to which the interactive data 68 pertains. The media database 50 is connected to media signal provider 14 so as to record programs which may be viewed by the user 18. Thus, the media database 50 contains a reference copy of the same program which the user 18 is viewing, so that the interactive data 68 from the set-top box 12 of the user 18 may be interpreted and its specific context determined The clustering unit 52 receives interactive data and its determined context from the frame determination unit 48 and aggregates such data from multiple users viewing the same program, for storage in cluster database 54. Thus, for a given video program, the cluster database 54 will contain all of the points of interest which have been indicated by users watching the program. Additionally, the clustering unit 52 analyzes the aggregated points of interest for a given program to determine clusters of the points of interest. The clusters will generally be areas having a high spatiotemporal density of points of interest. The locations of the determined clusters within the video program are also stored in the cluster database 54.

The analysis unit 56 facilitates analysis of the clusters of a program by an analyzer 58 in order to determine the significance of each cluster. For example, the clusters may be associated with objects or persons appearing in the program. The analysis unit 56 enables a determination to be made regarding what object or person to which a given cluster relates. In one embodiment, this determination is facilitated by providing video playback of the relevant portion of the program corresponding to a given cluster while superimposing indicators of the points of interest which are part of the cluster.

Once the object which is associated with a cluster is determined, a response unit 60 enables the analyzer 58 to determine a response to be provided to each user which indicated a point of interest falling within the cluster. For example, the analyzer 58 may create a message which includes information relating to the object such as background, website links, purchase information, etc. The response unit 60 references a user database 62 which contains user account information for determining where and how to send messages to users. In one embodiment, the message may be sent to a user's 18 e-mail provider 64 via network 16. The user 18 will thus receive the message when she accesses her e-mail account via personal computer 66. In another embodiment, the message is sent to the user's 18 set-top box 12, so that the message may be viewed on television 10.

Figure 4:
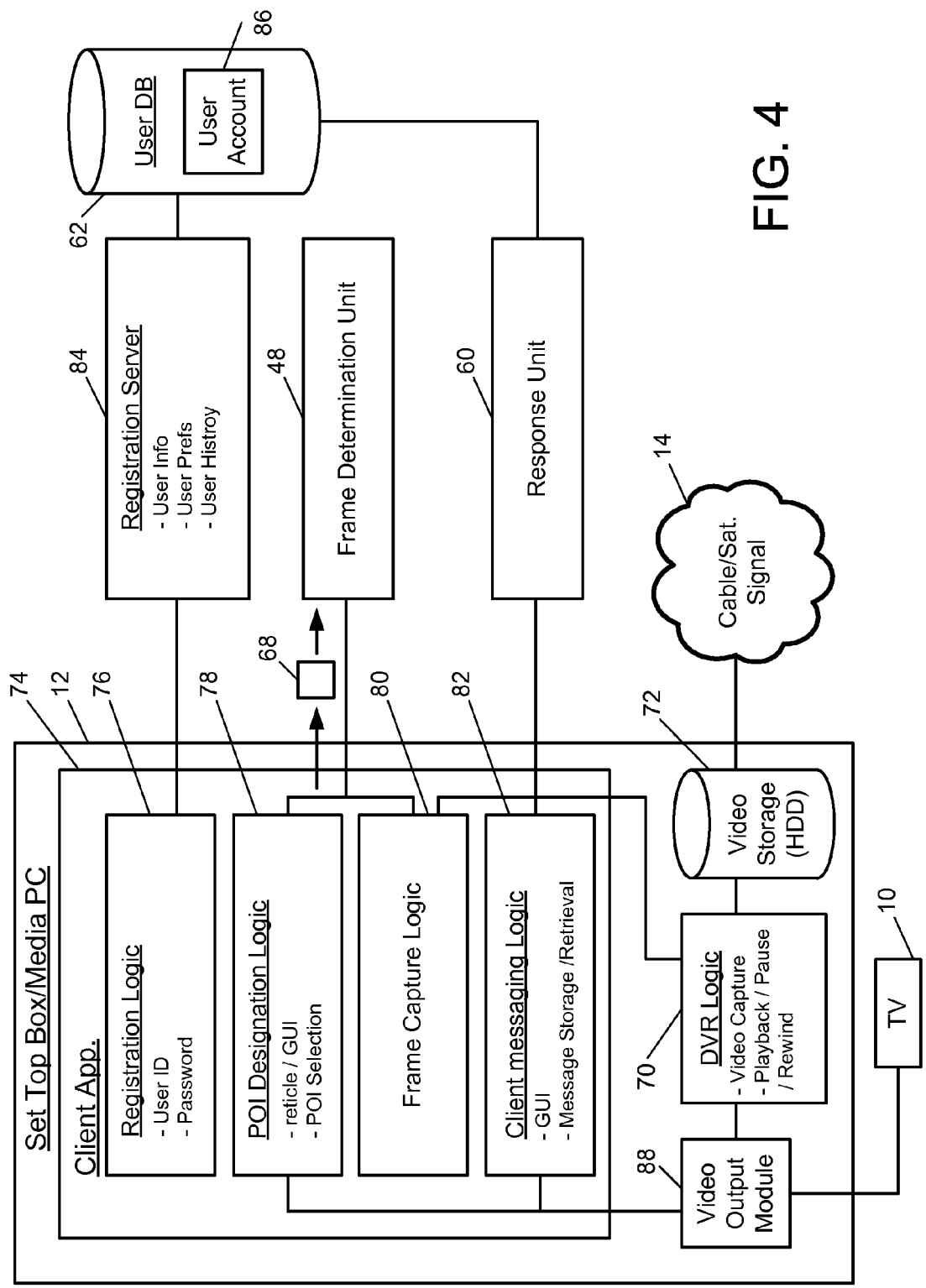
FIG. 4 illustrates a detailed view of a set-top box, in accordance with an embodiment of the invention.

With reference to FIG. 4, a detailed view of the set-top box 12 is provided, illustrating features of the set-top box 12 in accordance with an embodiment of the invention. The set-top box 12 receives a media signal from a signal provider 14, and provides video output for display on a television 10. The set-top box 12 includes DVR logic 70 for performing various digital video recording functions. For example, the DVR logic 70 facilitates recording of video content to video storage 72. The video storage 72 may be a hard disk drive, flash memory, optical storage media, or other type of media capable of storing video content for later retrieval. DVR logic 70 also enables playback, pause, fast-forward, and rewind features during viewing of a program.

The set-top box 12 also includes a client application 74, which is operable for enabling selection of areas of interest within video content. The client application 74 includes registration logic 76. The registration logic 76 communicates with a registration server 84 to facilitate registration of the client application 74. In one embodiment, the user 18 using the client application 74 creates a user account 86 in a user database 62 that is accessed by the registration server 84. Information stored as part of the user's 18 user account 86 may include the following: user ID, password, address and contact information, messaging preferences, program viewing history, previously identified areas of interest, and other information and customization features related to the user's 18 interaction with the client application 74.

The client application 74 includes point-of-interest (POI) designation logic 78. The POI designation logic 78 facilitates selection of a POI within video content by providing a graphical user interface (GUI) which is displayed as an overlay on the video content. The video content may be paused or in playback mode as controlled by the DVR logic 70. However, as a practical matter, it is likely that a user 18 would need to pause playback of the video content (and perhaps rewind) before making use of the POI selection features of the client application 74. In one embodiment, the GUI includes a reticle that is maneuverable by the user 18 on-screen so as to enable selection of a POI. Selection of a POI produces selection data indicative of the location of the POI within the video content, such as spatial coordinates, elapsed time, etc. The GUI may include other graphical or text overlays for indicating that client application 74 is active and able to accept input designating a POI. In various embodiments, the POI may consist of a singular point within an image frame of the video content, a region within an image frame, or an entire image frame or series of image frames.

In one embodiment, the POI designation logic 78 may include automatic identification of potential features of interest by use of auto-recognition technologies such as face-detection or object detection. The automatically identified potential features of interest may be indicated to the user by various visual effects, such as highlighting borders, adjusting brightness, desaturation of non-identified regions, etc.

When a POI has been selected, frame capture logic 80 is activated to capture one or more image frames of the video content from which the POI has been selected. In one embodiment, the frame capture logic 80 communicates with DVR logic 70 to determine and capture the relevant image frame of the video content. The captured image frame along with selection data from the POI designation logic 78 together form the interactive selection data 68 which is sent to the frame determination unit 48. In various embodiments, the frame capture logic 80 may generate a hash or fingerprint of one or more image frames. In another embodiment, the frame capture logic 80 captures an encoded broadcast packet of the video content.

The client application 74 additionally includes client messaging logic 82, which facilitates messaging functions of the client application 74. The client messaging logic 82 provides a GUI for enabling a user 18 to view messages, and perform other functions such as deleting, forwarding, and organizing messages. The client messaging logic 82 facilitates storage and/or retrieval of messages. In one embodiment, messages may be received from the response unit 60 by the client application 74 and stored locally on the set-top box 12 by the messaging logic 82. In another embodiment, messages may be stored in a remote database, such as the user database 62, and retrieved by the client messaging logic 82 when requested by the user 18.

The set-top box 12 includes video output module 88 which combines video data from both the client application 74 (e.g. GUI's of the POI designation logic 78 and client messaging logic 82) and the DVR logic 70 and renders them for display on television 10.

Figure 5:
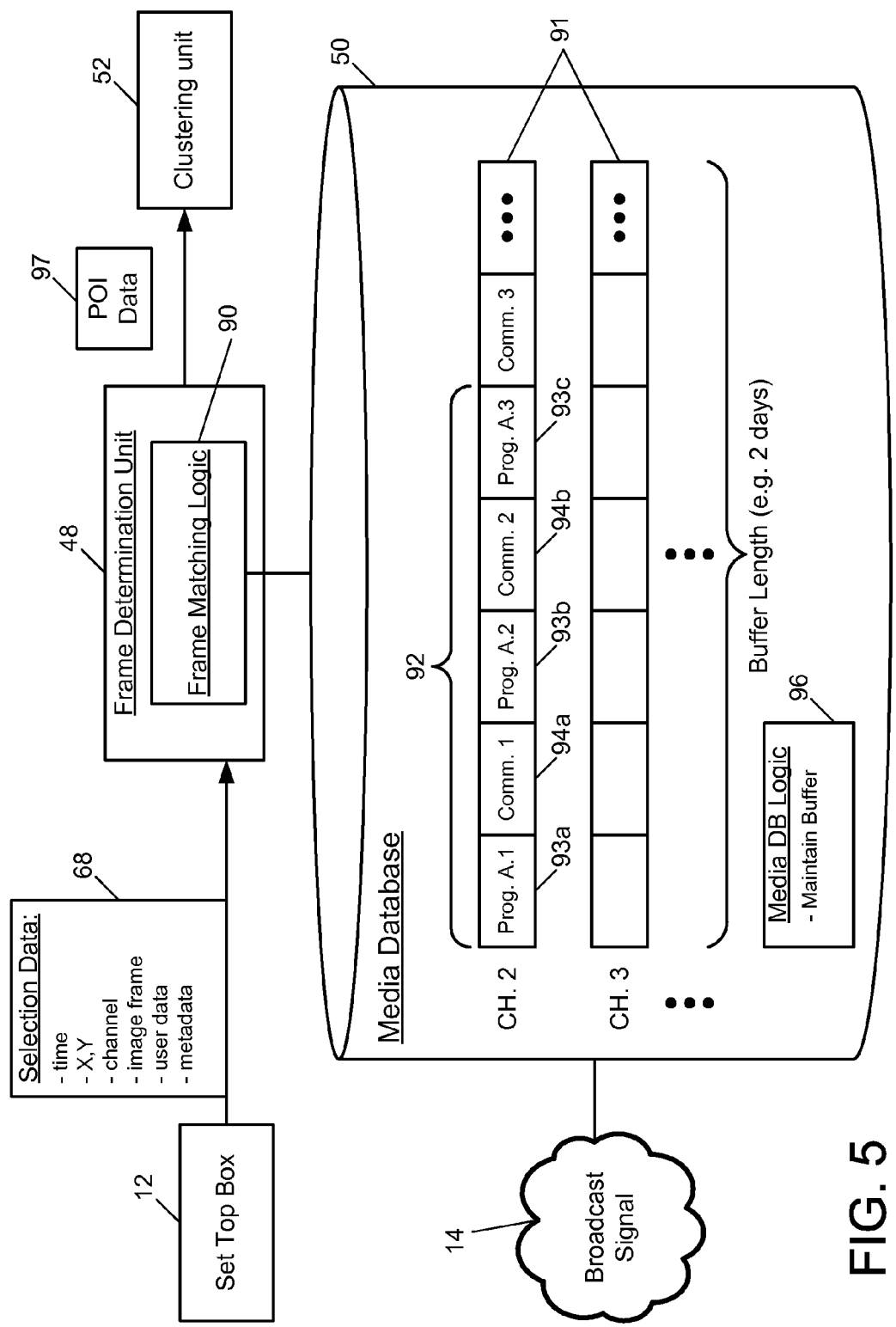
FIG. 5 illustrates a detailed view of a frame determination unit and media database, in accordance with an embodiment of the invention.

With reference to FIG. 5, a detailed view of the frame determination unit 48 and media database 50 is provided, in accordance with an embodiment of the invention. The frame determination unit 48 receives interactive selection data 68 from the set-top box 12. The interactive selection data 68 contains information relating to a point of interest within video content which has been selected by a user 18. The interactive selection data may contain the following information: user data such as user ID and set-top box ID information, spatial coordinates of a selected POI within an image frame, one or more image frames of the video content, a hash or fingerprint of one or more image frames, an encoded broadcast packet, the channel and local time of the original broadcast of the video content, the elapsed time of the video content at which the POI was selected, and other associated metadata of the video content. In some embodiments, the interactive selection data may include a lower resolution image frame which has been downscaled, or a compressed image frame which has been processed according to an image or video compression method as is known in the art. Moreover, in various embodiments, any combination of the foregoing may be utilized to generate interactive selection data, provided that the combination represents sufficient data to accurately identify a selected POI from a user. In one embodiment, the interactive selection data includes a hash of a downscaled lower resolution image frame in combination with metadata, such as the program title.

For various reasons, the timing of a video program as recorded by one set-top box may differ from the timing of the same video program recorded by another set-top box. In other words, two different viewers utilizing different set-top boxes but watching the same video content and selecting the same POI may yield data having slightly different elapsed times. Moreover, locally inserted content such as commercials and insertions in live broadcasts may result in regional differences in what is ostensibly the same program. Thus, for clustering purposes, there is a need to determine the precise nature of image frames from which a POI has been selected.

The frame determination unit 48 includes frame matching logic 90 for referencing the interactive selection data 68 against data from media database 50 in order to determine the exact image frame from which the POI was selected. The frame matching logic 90 may employ various methods for determining the equivalence of image frames as are known in the art. In some embodiments, the frame matching logic 90 utilizes a hash or fingerprint of image frames for comparison purposes.

The media database 50 stores video content that may be viewed by user 18. The media database 50 thus receives and records content from a signal provider 14, in order to store the same video content which the user 18 may watch. Various channels are recorded on a continuous basis, thus forming a continuous video stream 91 for each channel. The media database 50 includes media database logic for maintaining the recorded video streams 91 as buffers of a preset length. For example, the media database 50 may be configured to store only the most recent 48 hours of video content for each channel. In other embodiments, the media database may be configured to store more than 48 hours or less than 48 hours.

In one embodiment, the length of time buffered by the media database 50 may be determined based upon how long a period of time is deemed acceptable for receiving interactive selection data. For example, a program may be broadcast at the same local time in different time zones, resulting in multiple broadcasts of the program occurring in succession. It may be desirable to set the buffering length of the media database 50 to be long enough to capture the interactive selection data from viewers in the different time zones who watch the program substantially at the time of its broadcast. This enables aggregation of the viewers' interactive selection data for clustering purposes. Additionally, it may be desirable to capture interactive selection data from users who record the program and watch it later. Thus, the buffering length may be extended so as to include the interactive selection data of these additional users when performing clustering, as described further below.

In other embodiments, the buffering length may be preset at different lengths for different channels. For example, a channel featuring content that is more likely to be viewed live or close in time to the live broadcast (e.g. channels featuring "live" broadcasts such as sports, news, and other events) may have a shorter buffering length. In such cases, the majority of interactive selection data will be generated at the time of the broadcast or shortly thereafter, so that only a relatively short buffering of the channel is required for clustering purposes. Whereas a channel featuring content that is often recorded and viewed later may require a longer buffering length, as a significant portion of the interactive selection data may be received at a time point substantially after the original broadcast of the video content.

For each channel recorded by the media database 50, a video stream 91 is stored. A video stream 91 may consist of a number of successive program streams 92. A program stream 92 is a single television programming event, such as an episode of a television series, a movie, a news program broadcast, an educational program, a sporting event broadcast, etc. In the illustrated example, the program stream 92 includes program segments 93a, 93b, and 93c, which are interspersed with commercials 94a and 94b. Program streams in different geographical locations may have the same program segments, but have different commercials which are locally inserted for relevance purposes. Or in some cases, a program segment may be substantially the same when broadcast in different localities, but contain portions which are locally inserted for the specific market area. Because of such potential differences, it can be important to perform frame matching in order to determine the precise context of the interactive selection data 68.

Frame matching logic 90 thus references the video streams 91 of the media database 50 to determine the exact frame within a program segment, commercial, or other portion of video stream 91, from which the interactive selection data 68 was generated. In various embodiments, this may be accomplished by comparing hash values, or fingerprint values. The results of the frame matching process are communicated to the clustering unit 52, and include contextual information for authoritatively defining the selected POI, such as the particular program stream, and the frame or frames within the program stream, and the spatial coordinates within the frame or frames, which define the POI. Collectively, these form POI data 97 which is communicated to clustering unit 52.

While the foregoing embodiment has been described with reference to media database 50 being configured to directly record actual broadcast video, it is recognized that other methods may be employed for receiving and storing video in the media database 50. For example, the broadcast video may be downloaded or received from other sources, or directly from the provider. In one embodiment, media database 50 may receive commercials for a given market independently of the program streams which are broadcast in that market. Thus, only one copy of a given program stream need be stored by the media database 50, even though it is shown in multiple markets. The appropriate commercials for the given market are referenced for frame-matching purposes when the interactive selection data 68 is generated from that market.

Figure 6:
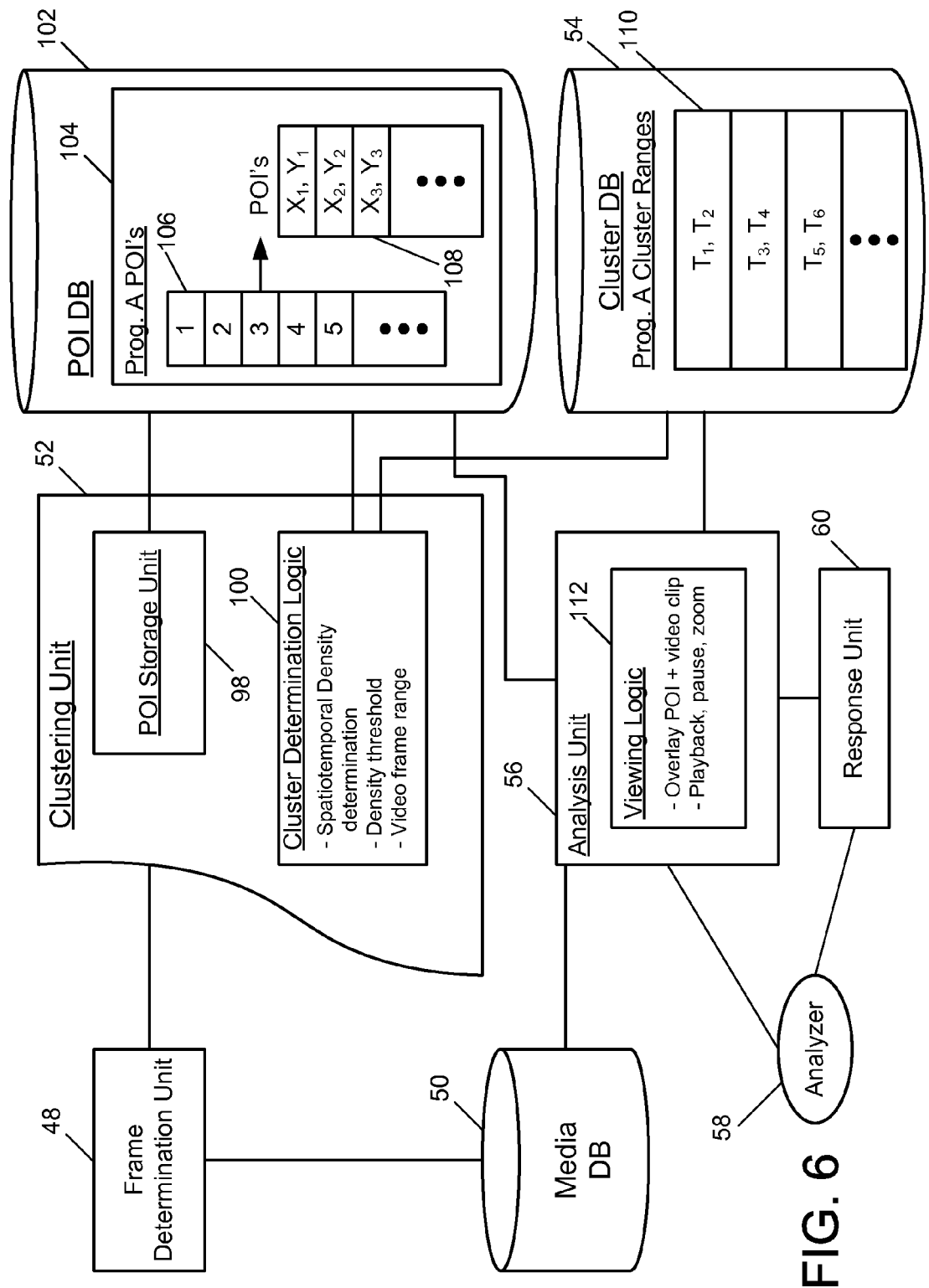
FIG. 6 illustrates a detailed view of a clustering unit and an analysis unit, in accordance with an embodiment of the invention.

With reference to FIG. 6, a detailed view of a clustering unit 52 and an analysis unit 56 are provided, in accordance with an embodiment of the invention. The clustering unit 52 receives POI data 97 from the frame determination unit which authoritatively defines a selected POI, indicating the coordinates, the image frame, and the program or commercial from which the POI was selected. The clustering unit 52 includes POI storage logic 98 for storing the data in a POI database 102. The POI database 102 provides storage for aggregating the data defining selected points of interest for each program, commercial, or other broadcast video content.

Thus, by way of example, a program's POI data 104 may include a list of frame numbers 106 of the program. In one embodiment, the list of frame numbers 106 represents only the frames of the program segments of a given program stream, without the commercials. Each entry within the list of frame numbers 106 may reference a list of coordinates 108 which contains the coordinates of all the selected points of interest within that frame. When new POI data 97 is received regarding a selected POI, the POI storage logic 98 determines the appropriate frame number within the list of frame numbers 106 and adds the coordinates of the POI to the list of coordinates 108. Likewise, data regarding selected points of interest for a given commercial or other video content may be stored in a similar fashion; i.e. as a list of frames of the commercial or video wherein each entry may reference a list of coordinates of the selected points of interest within that frame. In this manner, for each program, commercial, or other video content for which points of interest have been selected, the data which defines the selected points of interest is aggregated.

The clustering unit 52 also includes cluster determination logic 100, for determining clusters of points of interest based on the aggregated data stored in the POI database 102. As is known in the art, for a given set of data defined in a multi-dimensional space, clusters of the data may generally be defined as the high density regions, which are separated by lower density regions. In the present application, data defining selected points of interest in a given video program may be projected in a three-dimensional spatiotemporal space having one temporal axis representing elapsed time, and two spatial axes for representing the two-dimensional space of an image frame. So each POI can be plotted in the spatiotemporal space based on its frame number (which represents elapsed time within the program) and coordinates of location within the relevant image frame. An example visualization of such a projection is illustrated at FIG. 9B. Each POI within the spatiotemporal space is separated from another POI by a spatiotemporal distance. The clusters are generally identified as those regions within the spatiotemporal space representing the video program that have a high spatiotemporal density, and are separated from each other by regions having lower spatiotemporal density.

It will be understood by those skilled in the art that any of numerous methods for performing cluster analysis of a program's POI data 104 may be applied in the present instance. Examples of types of clustering methods include hierarchical algorithms such as single-link and complete-link, and partitional algorithms such as K-means. However, these are provided by way of example only, and not by way of limitation. The cluster determination logic 100 may employ one or more such cluster analysis methods as are known in the art for determining the location and members of clusters of points of interest. In one embodiment, a spatiotemporal density threshold is utilized to determine regions of high and low density. In various embodiments, the relative weighting for the temporal and spatial components for purposes of determining clusters may vary.

Once the clusters of the points of interest are determined by the cluster determination logic 100, the relevant data is stored in a cluster database 54. The cluster database 54 includes data which defines each cluster, indicating the members of a given cluster, and the elapsed time range within the video program at which the cluster occurs. For example, a video program may have a number of cluster ranges 110, which are the elapsed time ranges which contain clusters of points of interest, as determined by the cluster determination logic 100.

In various embodiments of the invention, it is possible to perform targeted cluster analysis based on demographic factors which are recorded as part of a user's account data. For example, assuming that the user account information includes geographic location information, then it is possible to perform cluster analysis of only those selected points of interest which originated from a particular geographic location. This may be useful for ascertaining the interests and preferences of a particular geographic market. Or if the user account information includes age information, the cluster analysis may be targeted to specific age groups. Moreover, user account information may include other demographic information such as gender, viewing preferences, household income, etc., all of which can serve as factors for targeted cluster analysis. This can provide insight into the correlation between demographic factors and selected points of interest, and also enables messages which are sent in response to selected points of interest (as described in further detail below) to be tailored depending upon the nature of the demographic group.

An analysis unit 56 facilitates determination of the significance of a particular cluster by an analyzer 58. The analysis unit 56 includes viewing logic 112 which enables the analyzer 58 to view the portion of video content in which a given cluster is found. The viewing logic 112 references the determined cluster ranges 110 to present portions of the video program which contain clusters of points of interest. To facilitate identification of the clusters and their significance by the analyzer 58, the portion of video is presented with graphical indicators which are overlayed on the video to denote the presence of selected points of interest. By way of example, the graphical indicators may be specific marks or distinctly colored dots or pixels, or other graphical overlays which illustrate the presence of selected points of interest to the analyzer 58. Moreover, in various embodiments, when multiple points of interest are adjacent or close to each other, or when the exact same point of interest is selected multiple times, the brightness, color, intensity of color, or other property of pixels or dots representing the points of interest may be varied to highlight the high density of points of interest. In one embodiment, neighbor additive color or brightness is applied, so that points of interest nearest to each other are displayed in an intensified manner. In one embodiment, the brightness of a pixel increases as the number of selections of the point of interest increases. Additionally, the viewing logic 112 includes features for controlling playback of the video portion, such as pausing and rewinding the video portion, and zooming in on a particular section.

By viewing a playback of the portion of video containing a cluster, with the cluster indicated by overlayed graphical indicators, the analyzer 58 is able to determine the exact nature and significance of a given cluster of selected points of interest. For example, the analyzer 58 may discover that the cluster relates to an object, product, person, place, event, or other type of entity or concept portrayed or otherwise communicated in the relevant video portion.

Figure 7:
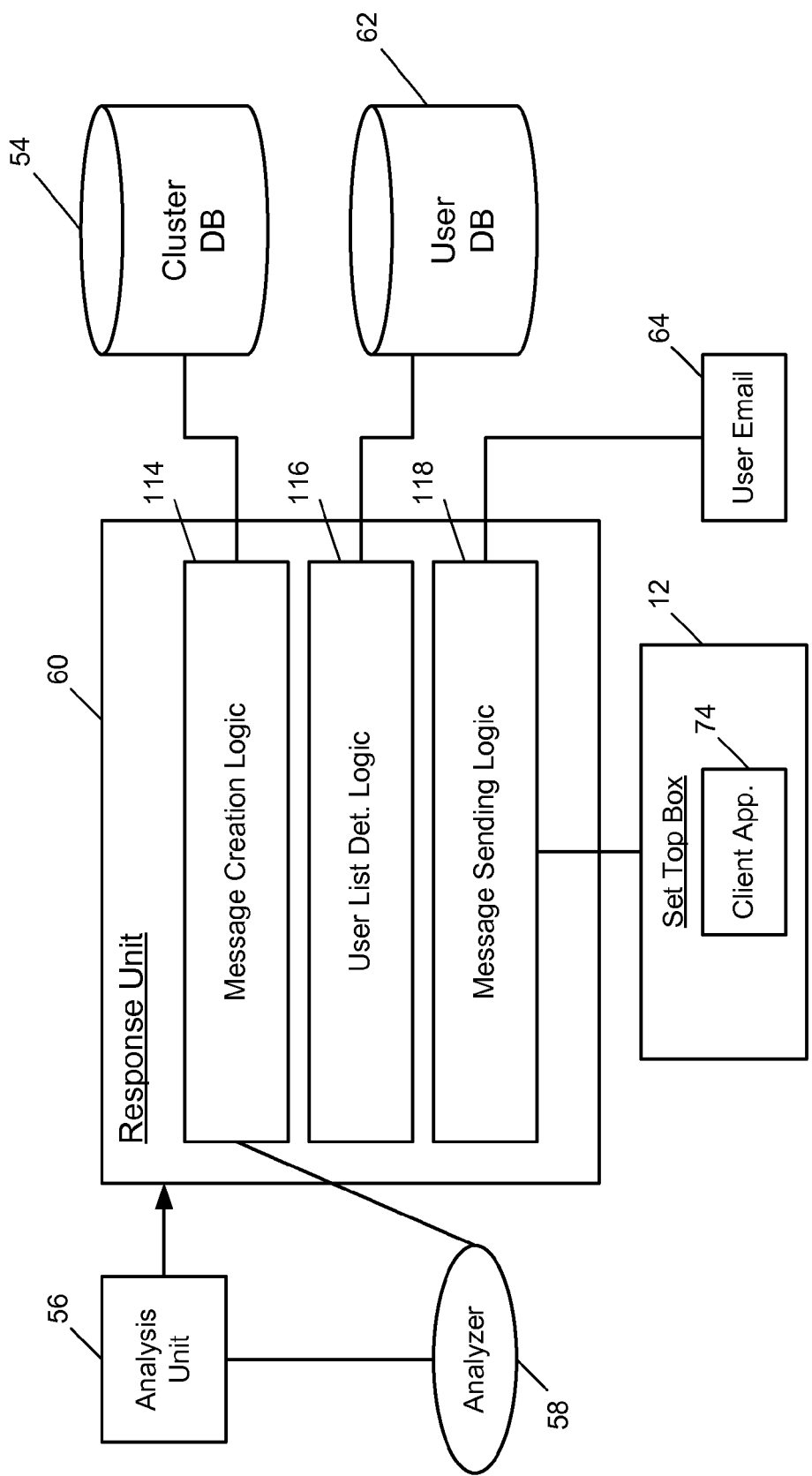
FIG. 7 illustrates a detailed view of a response unit, in accordance with an embodiment of the invention.

With reference to FIG. 7, a detailed view of a response unit 60 is illustrated, in accordance with an embodiment of the invention. The response unit 60 is utilized by the analyzer 58 to develop and send messages to those users who selected a point of interest in a given cluster. For a given cluster that is defined in the cluster database 54, after the analyzer 58 has utilized analysis unit 56 to ascertain the significance of the cluster, the analyzer 58 may utilize response unit 60 to craft a relevant message which relates to the cluster.

Accordingly, the response unit 60 includes message creation logic 114 for enabling the analyzer 58 to create an appropriate message related to the cluster. In one embodiment, the message creation logic 114 presents a GUI to the analyzer 58 which facilitates text and media input. The created message is associated with its corresponding cluster in the cluster database 54. The scope and content of a message which relates to a cluster may vary to a considerable extent. For example, if a cluster relates to a particular object, the message may contain information related to the object, such as background and descriptive information, links to related websites, pictures, video, audio, etc.

In other embodiments, the message may include an advertisement sent to the user or a direct purchasing option which enables the user to purchase the object (e.g. by clicking on a purchase button).

In other embodiments of the invention, the clustered interactions may be utilized to affect users' experiences apart from the broadcast television viewing experience. For example, a user that indicated particular selections when viewing broadcast television might have advertising tailored to those selections when browsing online at an internet site which has access to the user's selection history.

In another example, if a cluster relates to a particular product, the message may contain information related to the product such as the following: descriptive information about the product, information about where to buy the product, links to related websites, links to reviews of the product, links to online stores that may be selling the product, a comparison list of prices from various sellers, pictures, videos, a map showing locations of sellers, a coupon offering a discount on the product or related products, etc. Or in another example, if a cluster relates to a person, the message may contain information related to the person, such as bibliographical information, images, video, audio, links to related content, etc.

User list determination logic 116 determines the users to whom a message will be sent which relates to a particular cluster. This is accomplished by determining the user associated with each point of interest in the cluster. Additionally, the user list determination logic references the user database 62 to determine each associated user's messaging settings, so as to determine the appropriate method for sending the message to each user.

Message sending logic 118 sends the message to the users in accordance with their messaging settings. In one embodiment, the message is sent to the user's set-top box 12, to be handled by the client application 74 running on the set-top box 12. Or in the alternative, the message is stored with the user's account, and the user is notified that there is a new message when the client application 74 is activated. When the user 18 retrieves the message, it is transferred to the set-top box 12. In other embodiments, the message may be sent via any of various messaging mechanisms. For example, the message may be sent to the user's email account 64, and later retrieved by the user 18 via a computer 66. Or the message may be sent via (SMS) text message to a user's phone, via regular postal mail, etc.

In one embodiment, after a response has been generated for a given object which corresponds to a particular cluster of points of interest, features are provided for automatically sending the associated response to users who later view the same video program and indicate a point of interest within the region of the cluster. This may be facilitated by the clustering unit 52, which may reference incoming POI data 97 against the cluster database 102 to determine if a cluster has already been defined in which the POI may be classified. Clusters may be defined by a spatiotemporal region within the video content. If the POI falls within the spatiotemporal region which defines the cluster, then the message corresponding to the cluster may be automatically sent to the user without the need to perform additional analysis.

Figure 8:
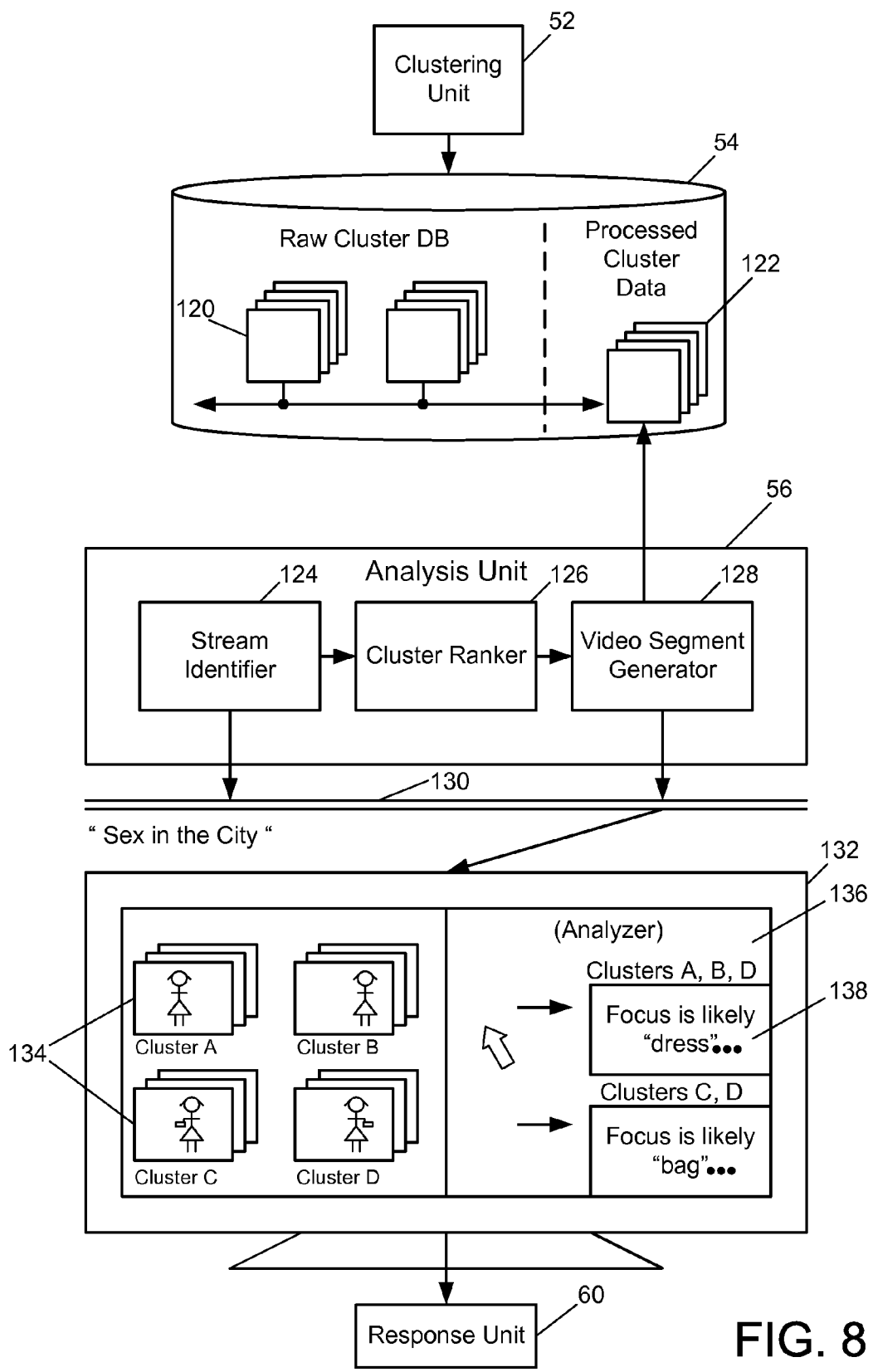
FIG. 8 illustrates a detailed view of operation of an analysis unit 56, in accordance with an embodiment of the invention.

With reference to FIG. 8, a detailed view illustrating operation of an analysis unit 56 is shown, in accordance with an embodiment of the invention. As shown, the clustering unit 52 determines clusters of selected points of interest within a particular video stream 130. The video stream 130 may be a singular broadcast event, such as an episode of a television show, or other form of video content. The resulting determined clusters of the video stream 130 constitute raw cluster data 120, which is stored in cluster database 54. The raw cluster data 120 indicates each of the clusters and the points of interest which belong to each cluster.

The analysis unit includes stream identifier 124 for determining a selected video stream 130 for further analysis. A cluster ranker 126 is provided for ranking the various clusters of the selected video stream 130. In one embodiment, the ranking is based on the number of selected points of interest falling within each cluster, such that the highest ranked clusters have the greatest number of points of interest. In other embodiments, the ranking may be based on other measures of the significance of a cluster, such as spatiotemporal density.

The analysis unit includes a video segment generator 128 for generating a video segment corresponding to each of the clusters. The generated video segment consists of a portion of video from the video stream 130 during which the points of interest of a particular cluster appear. Additionally, the points of interest are highlighted in the generated video segment to facilitate identification of the cluster and determination of its significance.

The analysis unit 56 provides a GUI which is shown on display 132, which may be a monitor, television, or other type of display. In one embodiment, the GUI includes thumbnail images 134, which are representative images from the video segments corresponding to the clusters. The thumbnail images 134 may be arranged in accordance with the ranking of the corresponding clusters. Selection of one of the thumbnail images 134 causes playback of the corresponding video segment. As the video segment is played, so the points of interest of the cluster are highlighted, which enables one to determine the exact nature of the cluster and what it is that the cluster identifies.

The GUI additionally includes an annotation section 136 for enabling an analyzer to enter data regarding the analyzed clusters. The annotation section 136 may include various fields 138 for entering data relating to the clusters. In various embodiments, the fields 138 may be designated for different types of information relating to the clusters, such as descriptions of a focus of a cluster, links to related websites, media files, etc.

It is noted that multiple clusters may be determined to indicate the same object, as might be expected when the same object appears multiple times throughout a video stream. Therefore, the analysis unit 56 supports merging of clusters that are determined to indicate the same object. In this manner, a single cluster is defined for a single object of interest, so that duplicate messages are not created for separately identified clusters that in fact relate to the same object.

The results of the processing performed by the analysis unit 56 are stored as processed cluster data 122 in the cluster database 54. The processed cluster data may include the results of merging clusters, as well as associated annotations which describe and relate to the focus of each of the clusters.

Figure 9A:
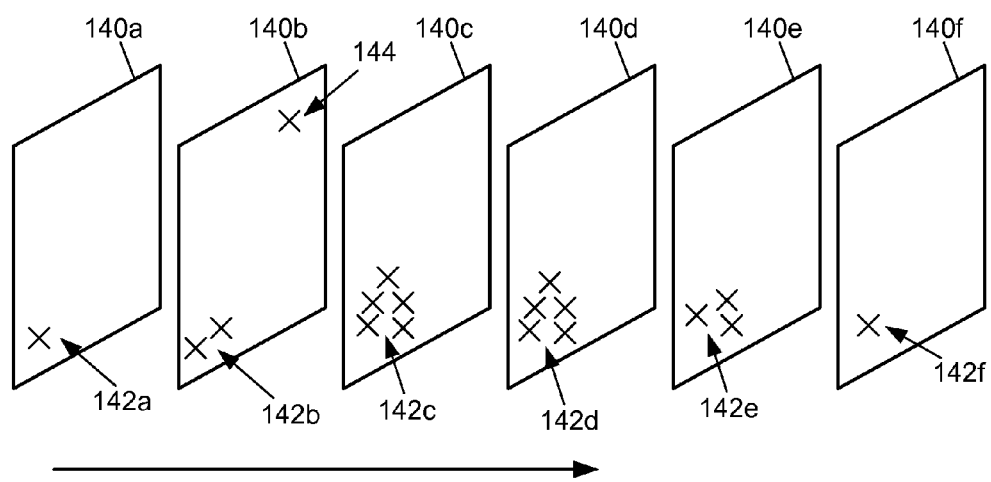
FIG. 9A illustrates a series of image frames from a video segment, in accordance with an embodiment of the invention.
Figure 9B:
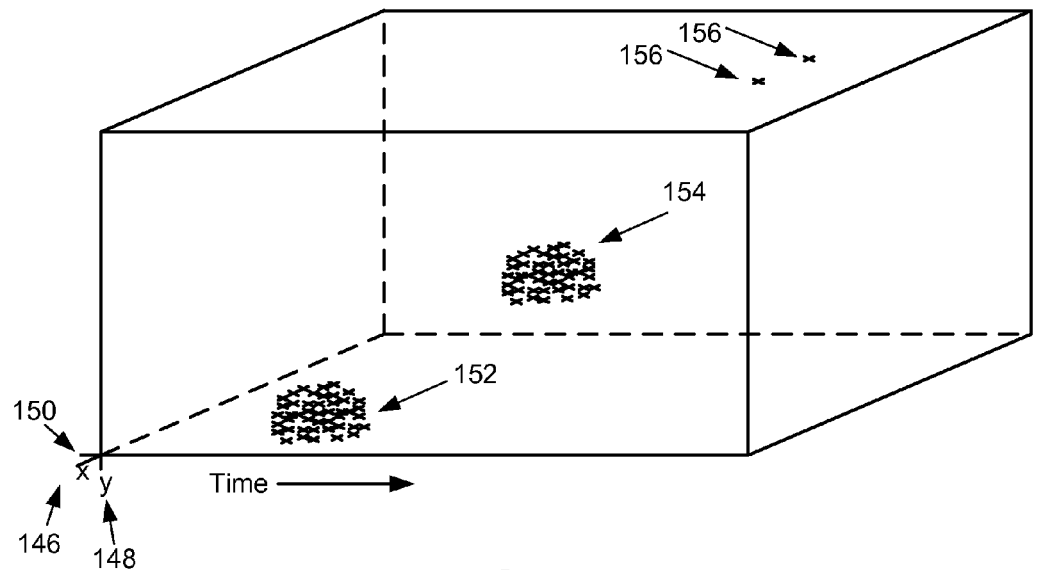
FIG. 9B illustrates a spatiotemporal field representing a video segment, in accordance with an embodiment of the invention.

With reference to FIG. 9A, a series of image frames from a video segment are illustrated, in accordance with an embodiment of the invention. The image frames 140a-140f are successive image frames from a video segment as might be seen by an analyzer 58 that is viewing the image frames in order to determine the significance of a cluster. The points of interest of a cluster are shown in the image frames 140a-140f at 142a-142f, respectively. The distribution of points of interest is such that the earliest and latest image frames (e.g. 140a, 140b and 140e, 140f) in the series have fewer points of interest than the temporally central image frames (140c and 140d). Thus, as the analyzer 58 views the image frames in rapid succession, the analyzer 58 sees an increasing and then decreasing number of points of interest in a particular area.

The analyzer 58 thus viewing the clustered points of interest in succession is able to reference to content of the image frames to determine the significant of the cluster.

In contrast, a discreet point of interest 144 is shown at image frame 140b. Because this point of interest 144 appears in relative isolation, it may be deemed by the analyzer 58 to be relatively unimportant.

With reference to FIG. 9B, an illustration of a spatiotemporal field representing a video segment is shown, in accordance with an embodiment of the invention. The spatiotemporal field is visualized having three dimensions, represented by three axes 146, 148, and 150. The x-axis 146 and y-axis 148 represent the spatial dimensions of an image frame of the video segment. The time axis 150 represents the elapsed time of the video segment. Selected points of interest within the video segment are plotted in the spatiotemporal field according to their elapsed time and spatial coordinates. Clusters of points of interest are shown at 152 and 154, these being regions within the spatiotemporal field which exhibit a high density of points of interest. In contrast, points 156 exist in a comparatively low density region of the spatiotemporal field.

Figures 10, 11:
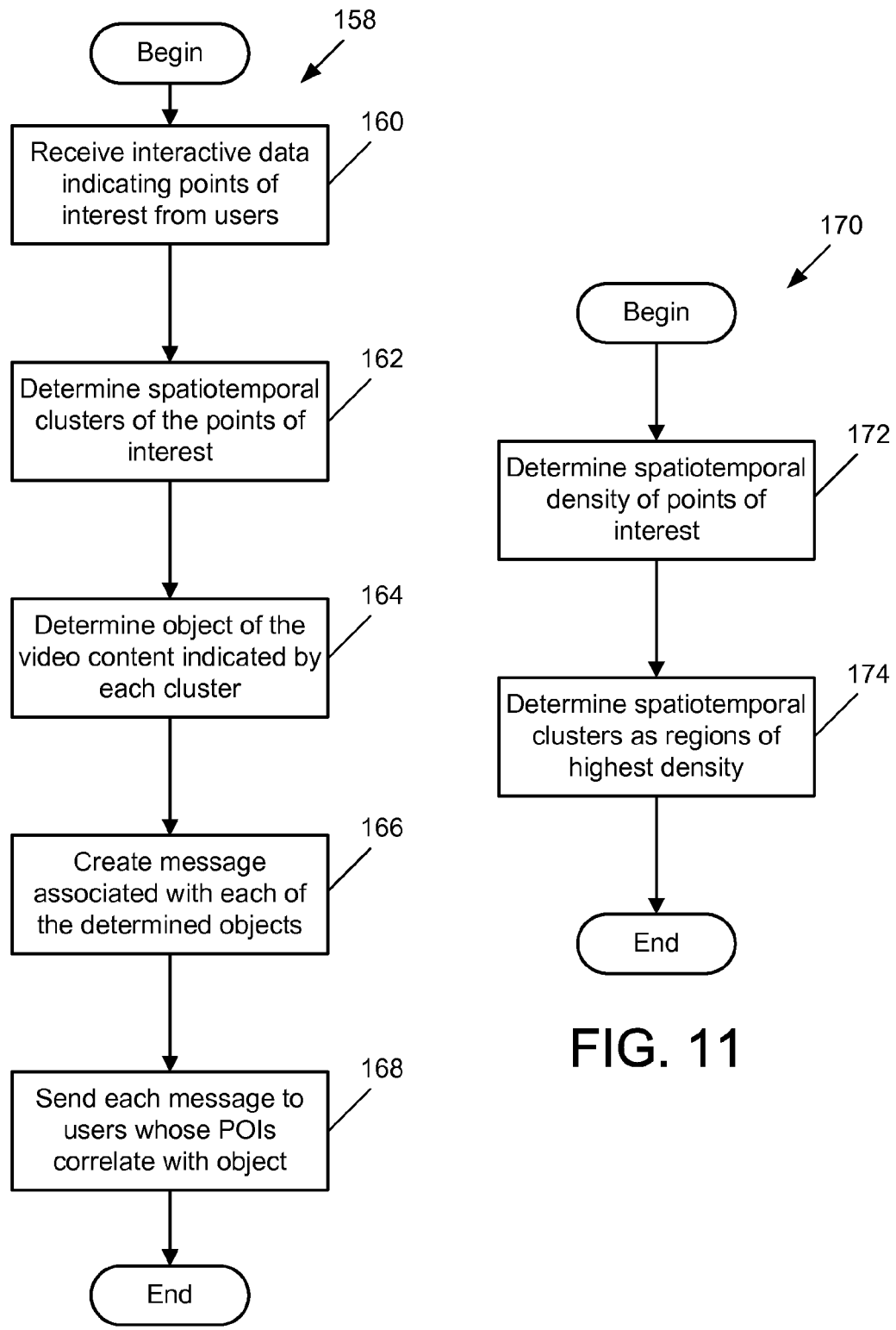
FIG. 10 illustrates a method for sending messages to users related to video content.
FIG. 11 illustrates a method for determining spatiotemporal clusters of points of interest within video content.

With reference to FIG. 10, a method 158 for sending messages to users related to video content is illustrated. At method operation 160, interactive data indicating points of interest within the video content is received from users, the points of interest being selected by users during viewing of the video content. At method operation 162, spatiotemporal clusters of the points of interest are determined. At method operation 164, an object of the video content indicated by each of the spatiotemporal clusters is determined. At method operation 166, a message associated with each of the determined objects is created, each message containing information relating to its corresponding object. At method operation 168, each of the messages is sent to the users whose selected points of interest correlate with the objects associated with the messages.

With reference to FIG. 11, a method 170 for determining spatiotemporal clusters of points of interest within video content is illustrated. At method operation 172, the spatiotemporal density of the points of interest is determined based upon geometric distances between points of interest within frames of the video content and temporal distances between points of interest in different frames of the video content. At method operation 174, the spatiotemporal clusters are determined to be those regions of the video content having the highest spatiotemporal density.

In other embodiments of the invention, a click-to-purchase function may be provided, in accordance with the methods and systems described herein. In one embodiment, clustered points of interest may be utilized to identify a product within video content for which click-to-purchase functionality may be attached. When a user subsequently selects a POI within spatiotemporal space of the product (as verified through frame-matching as described above) the set-top box's client application 74 may provide the user with the capability to purchase the product. In one embodiment, the client application 74 communicates with a backend transactional system which facilitates communication of product information such as description, price and quantity, and handles the purchase transaction. It will be recognized by those skilled in the art that various systems and methods may be employed to facilitate an electronic purchase transaction, without departing from the scope of the present invention. To facilitate easier purchasing, the user may have stored credit card or other payment information as part of her user account information. In another embodiment, the client application 74 may direct the user to a web site for purchasing the product.

In one embodiment, commercials may be identified beforehand either in part or in their entirety for click-to-purchase functionality. In such an embodiment, user interactions need not be clustered because the click-to-purchase functionality attaching to the commercial has been predetermined.

In one embodiment, when a commercial is shown, a click-to-purchase button may be displayed by the client application 74. Thus, for the duration of the commercial, the user may select the click-to-purchase button in order to buy the item being advertised in the commercial.

While the foregoing embodiments have generally been described with reference to broadcast television content, it is recognized that similar methods and systems as those described above may be applied to video content from other sources, such as optical media such as DVD's, and the Internet.

Embodiments of the invention as herein described may utilize relational database systems as are known in the art. Examples of such database systems include MySQL, Oracle, and Access. Various operations as described above may be effected by performance of an operation via a relational database management system. Such database systems may be embodied in one or more server computers, which may be configured as part of a network of computers.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g. a cloud of computing resources.

The embodiments of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code on a computer readable medium. The computer readable medium may be any data storage device that can store data, which can thereafter be read by a computer system. Examples of the computer readable medium include hard drives, network attached storage (NAS), read-only memory, random-access memory, FLASH based memory, CD-ROMs, CD-Rs, CD-RWs, DVDs, magnetic tapes, and other optical and non-optical data storage devices. The computer readable medium can also be distributed over a network coupled computer systems so that the computer readable code may be stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer-implemented method using a processor for identifying objects of interest in video content viewed by a plurality of users, the method comprising,
   receiving interactive data indicating points of interest within the video content from the users, the points of interest being selected by users during viewing of the video content;
   determining spatiotemporal density of the points of interest;
   determining spatiotemporal clusters of the points of interest as being those regions of the video content having a highest spatiotemporal density; and
   determining an object of the video content indicated by each of the spatiotemporal clusters;
   wherein each of the operations of the method is executed by the processor.

2. The computer-implemented method of claim 1, wherein the points of interest are determined by referencing the interactive data against a media database to identify the video content and a location of the point of interest within the video content.

3. The computer-implemented method of claim 1, further comprising,
   generating a message associated with a determined object, the message containing information relating to the determined object; and
   sending the message to accounts of the users whose selected points of interest correlate with the determined object associated with the message.

4. The computer-implemented method of claim 3, wherein the information relating to the determined object includes one or more of background information, a website link, or purchase information.

5. The computer-implemented method of claim 1, wherein each point of interest identifies one or more of the following: coordinates of a location within an image frame, a region within an image frame, an entire image frame, or a series of image frames.

6. The computer-implemented method of claim 1, wherein the determining spatiotemporal density of the points of interest is based upon geometric distances between points of interest within frames of the video content and temporal distances between points of interest in different frames of the video content.

7. The computer-implemented method of claim 1, wherein the regions of the video content having the highest spatiotemporal density are determined based on a spatiotemporal density threshold.

8. The computer-implemented method of claim 1, further comprising, filtering the points of interest according to a demographic characteristic, the demographic characteristic including one or more of geographic location, age, gender, or income.

9. The computer-implemented method of claim 1, further comprising: presenting a view of a portion of the video content in which an associated spatiotemporal cluster is found, the view providing a graphical indicator identifying the associated spatiotemporal cluster.

10. The computer-implemented method of claim 9, wherein the graphical indicator is defined by pixels having a characteristic adjusted to indicate a relative number of points of interest within the associated spatiotemporal cluster.

11. A non-transitory computer-readable storage medium including instructions that, when executed by a processing device, cause the processing device to perform operations comprising:
   receiving interactive data indicating points of interest within the video content from the users, the points of interest being selected by users during viewing of the video content;
   determining, by processing device, spatiotemporal density of the points of interest; program instructions for determining spatiotemporal clusters of the points of interest as being those regions of the video content having a highest spatiotemporal density; and
   determining, by processing device, an object of the video content indicated by each of the spatiotemporal clusters.

12. The non-transitory computer-readable storage medium of claim 11, wherein the points of interest are determined by referencing the interactive data against a media database to identify the video content and a location of the point of interest within the video content.

13. The non-transitory computer-readable storage medium of claim 11, wherein the operations further comprise: generating a message associated with a determined object, the message containing information relating to the determined object; and
   sending the message to accounts of the users whose selected points of interest correlate with the determined object associated with the message;
   wherein the information relating to the determined object includes one or more of background information, a website link, or purchase information.

14. The non-transitory computer-readable storage medium of claim 11, wherein the operations further comprise: filtering the points of interest according to a demographic characteristic, the demographic characteristic including one or more of geographic location, age, gender, or income.

15. The non-transitory computer-readable storage medium of claim 11, wherein the operations further comprise: presenting a view of a portion of the video content in which an associated spatiotemporal cluster is found, the view providing a graphical indicator identifying the associated spatiotemporal cluster;

wherein the graphical indicator is defined by pixels having a characteristic adjusted to indicate a relative number of points of interest within the associated spatiotemporal cluster.

16. A system for identifying objects of interest in video content viewed by a plurality of users, the system comprising:

a memory; and a processing device, coupled to the memory, to:

receive interactive data indicating points of interest within the video content from the users;

determine spatiotemporal density of the points of interest, and determining spatiotemporal clusters of the points of interest as being those regions of the video content having a highest spatiotemporal density; and determine an object of the video content indicated by each of the spatiotemporal clusters.

17. The system of claim 16, wherein the processing device is further to reference interactive data of a given point of interest against a media database to identify the video content and an image frame within the video content to which the interactive data of the given point of interest pertains.

18. The system of claim 16, wherein the processing device is further to:

generate a message associated with a determined object, the message containing information relating to the determined object; and send the message to accounts of the users whose selected points of interest correlate with the determined object associated with the message;

wherein the information relating to the determined object includes one or more of background information, a website link, or purchase information.

19. The system of claim 16, wherein the processing device is further to: filter the points of interest according to a demographic characteristic, the demographic characteristic including one or more of geographic location, age, gender, or income.

20. The system of claim 11, wherein the processing device is further to:

present a view of a portion of the video content in which an associated spatiotemporal cluster is found, the view providing a graphical indicator identifying the associated spatiotemporal cluster;

wherein the graphical indicator is defined by pixels having a characteristic adjusted to indicate a relative number of points of interest within the associated spatiotemporal cluster.

* * * * *